Patented Aug. 3, 1926.

1,594,843

UNITED STATES PATENT OFFICE.

JAMES W. LAWRIE, OF WILMINGTON, DELAWARE, ASSIGNOR TO E. I. DU PONT DE NEMOURS & COMPANY, OF WILMINGTON, DELAWARE, A CORPORATION OF DELAWARE.

PURIFICATION OF LACTIC ACID.

No Drawing.  Application filed August 19, 1921. Serial No. 493,692.

This invention relates to the purification of lactic acid, and pertains particularly to a new process of distilling lactic acid whereby the objectionable formation of lactid and of lactic anhydride is avoided.

Lactic acid is usually produced by the fermentation of carbohydrate materials by means of a lactic acid producing bacillus. In order to obtain the maximum conversion of the carbohydrate material to lactic acid it is usual to add calcium carbonate in the form of whiting, fine marble dust or ground chalk, etc. in quantity sufficient to react with all the lactic acid producible in the fermentation to form calcium lactate. After fermentation is completed it is the practice to treat the fermentation mass with just sufficient sulphuric acid to neutralize the excess calcium carbonate and convert the calcium lactate into calcium sulphate and lactic acid, to filter press the precipitated calcium sulphate, to evaporate the filtrate containing lactic acid to the desired strength, to treat the concentrated liquor with sufficient prussiate of soda to precipitate out all copper and iron, to settle, decant and put into packages for shipment.

With such a procedure it is readily seen that the solution of lactic acid is not pure. There are present various soluble salts which were in the original ingredients, unfermented sugars, pentoses, nitrogenous materials, etc.

A method of preparing a purer form of lactic acid is to take the fermented mash containing the calcium lactate and crystallize out as much of the calcium lactate as is practical. This is then filter pressed and washed, and the crystalline calcium lactate is treated with the proper amount of sulphuric acid and the calcium sulphate is filter pressed out. Only about 50% of the lactic acid produced in the fermentation is recovered in this purer form by this method. The lactic acid is of a fair degree of purity but it is expensive to produce, costing several times that of ordinary "light acid" of the same strength.

Another method is to convert the lactic acid into its ethyl ester (by boiling with ethyl alcohol and a little normal acid) and distilling in vacuo. The pure ester thus obtained is then decomposed by blowing through steam, the alcohol distilling over and the lactic acid remaining being concentrated by evaporation. The pure acid costs five to six times as much as the commercial variety.

It is not possible by ordinary methods to distill lactic acid and make fair recoveries of the acid. Lactic acid decomposes below its boiling point, and while still in solution with water, to produce lactic anhydride and lactid. As a result of this tendency to form an anhydride, the purification of lactic acid by distillation has heretofore not been practicable.

I have discovered that by making the distillation period almost instantaneous, I can almost or entirely eliminate or prevent the formation of lactic anhydride and lactid, and, with proper heat control, I can bring about a practically quantitative distillation of lactic acid.

In accordance with my invention the conditions of operation are such as to reduce to a minimum the length of time during which the lactic acid is kept at a vaporizing temperature, and the vaporizing temperature itself is kept at a minimum by working under the greatest practicable vacuum. In order to shorten the vaporizing period the impure lactic acid solution is brought into contact with a heating medium in such a way as to present thereto an extensive surface compared with the volume of said solution. This extensive surface can be produced, for example, either by injecting the solution in the form of a fine spray into a heating fluid, such as steam, or by spreading the solution in the form of a thin film over a heating surface, such as that of cast iron, having a high-heat conductivity.

In a preferred embodiment of my invention the distillation of the crude lactic acid solution, either with or without preliminary concentration, is carried out by using a vacuum rotary drum dryer as a still and applying a thin film of the solution to the surface of the heated drum. Good results may be obtained, for example, by wetting with lactic acid solution the surface of a drum 40 inches in diameter rotating at the rate of 1½ R. P. M., while maintaining the drum (or the heating fluid, such as oil, inside the drum) at a temperature between about 450 and 600° F., and maintaining a vacuum of about 29 inches of mercury below atmospheric pressure. Operating under these conditions the volatile constituents of the solution will have evaporated almost completely by the time the drum has made a quarter turn, leaving the solid, or high boiling, constituents or impurities as a crust on the drum, this crust being continuously removed in any suitable way. My process is not, of course, limited to the use of a vacuum of about 29" of mercury; however, I find it desirable to operate under a vacuum of more than 27" of mercury.

If it is desired to concentrate the lactic acid in addition to separating it from impurities of substantially higher boiling point than that of lactic acid, the vapors of lactic acid and water leaving the still are passed into a tower under a high vacuum where most of the water is separated in vapor from the condensed lactic acid.

Before subjecting a film of impure lactic acid solution to distillation in the manner above described it is in some cases desirable to preconcentrate the solution in a multiple effect evaporator under a high vacuum to form a solution containing from 30 to 40% or more of lactic acid.

The crude lactic acid solution to which my new process is applicable can be prepared in the ordinary way from starch or black strap molasses. When starting with starch, the latter is first converted into sugar by heating with acid, and is then fermented, the lactic acid being neutralized with calcium carbonate, as soon as it is formed. After treating the fermented mixture with sulphuric acid, and filtering of the calcium sulphate, there is obtained as a filtrate the crude lactic acid solution which can be advantageously purified by my process.

The crude solution resulting from the fermentation of black strap molasses contains gummy substances that have hitherto rendered impracticable any substantial concentration thereof. By following my process however, solutions of this kind can be distilled and concentrated without difficulty.

Although my invention has been described above in great detail it will be understood that the conditions of the new process may vary within a wide range, and that various changes and substitutions may be made without departing from the scope of my invention.

I claim:

1. The process of purifying an impure lactic acid solution which comprises bringing a relatively extensive surface compared with the volume of such a solution into contact with a heating medium having a temperature sufficient to effect almost instantaneous vaporization of substantially all of the lactic acid which has become heated by said medium.

2. The process of purifying an impure lactic acid solution which comprises suddenly heating a thin film of such solution at a temperature sufficient to effect almost instantaneous vaporization of the lactic acid in said film.

3. The process of purifying an impure lactic acid solution which comprises suddenly heating a thin film of such solution under a high vacuum at a temperature sufficient to effect almost instantaneous vaporization of the lactic acid in said film.

4. The process of purifying an impure lactic acid solution which comprises suddenly heating a thin film of such solution under a high vacuum at a temperature of from about 450 to 600° F.

5. The process of purifying an impure lactic acid solution which comprises bringing such solution into contact with a heating medium while the solution is in such a form as to expose a relatively extensive surface compared with the volume to said heating medium, the heating medium being at a temperature substantially above the boiling point of the lactic acid at the pressure prevailing during the process.

6. The process of purifying an impure lactic acid solution which comprises bringing such solution in the form of a thin film into heat-exchanging relation with a metal surface maintained at a temperature sufficiently above the boiling point of said solution to effect almost instantaneous vaporization of the lactic acid and water contained therein.

7. A process as defined in claim 6 with the further limitation that the vaporization of the lactic acid is effected under a vacuum of more than 27 inches of mercury.

8. The process of purifying an impure lactic acid solution containing from about 20 to 40% of lactic acid which comprises heating a thin film of such solution to effect almost instantaneous vaporization of the lactic acid, condensing the lactic acid vapors, and separating water therefrom.

9. The process of purifying an impure lactic acid solution containing from about 20 to 40% of lactic acid which comprises heating a thin film of such solution at a temperature above 400° F. and under a high vacuum to effect almost instantaneous vaporization of the lactic acid, condensing the lactic acid vapors, and separating water therefrom.

In testimony whereof I affix my signature.

JAMES W. LAWRIE.